United States Patent
Berranger (12)

(10) Patent No.: US 7,292,686 B2
(45) Date of Patent: Nov. 6, 2007

(54) EXCHANGE NODE

(75) Inventor: Jean-Alexis Berranger, Meylan (FR)

(73) Assignee: Hewlett-Packard Company, Palo Alto, CA (US)

( * ) Notice: Subject to any disclaimer, the term of this patent is extended or adjusted under 35 U.S.C. 154(b) by 792 days.

(21) Appl. No.: 10/236,462

(22) Filed: Sep. 5, 2002

(65) Prior Publication Data

US 2003/0072430 A1  Apr. 17, 2003

(30) Foreign Application Priority Data

Sep. 6, 2001  (EP)  ................... 01410111

(51) Int. Cl.
  *H04M 3/42* (2006.01)
  *H04M 7/00* (2006.01)
(52) U.S. Cl. ............... 379/210.01; 379/221.01
(58) Field of Classification Search ........... 379/210.01, 379/221.01
  See application file for complete search history.

(56) References Cited

U.S. PATENT DOCUMENTS 4,991,204 A * 2/1991 Yamamoto et al. .... 379/221.01
5,058,105 A * 10/1991 Mansour et al. ............ 370/228
5,101,451 A * 3/1992 Ash et al. .............. 379/221.07
5,345,503 A 9/1994 Lee
5,615,254 A * 3/1997 Qiu et al. .............. 379/221.01
5,805,691 A 9/1998 Dendi
5,884,179 A 3/1999 Patel
5,963,633 A 10/1999 Dendi
6,430,150 B1 * 8/2002 Azuma et al. .............. 370/218

OTHER PUBLICATIONS

Itu-T, "Specification of Signalling System No. 7—ISDN supplementary services—Q.730," Sep. 1997, International Telecommunication Union, Geneva, Switzerland, pp. 27-30.

* cited by examiner

*Primary Examiner*—Rasha S. Al-Aubaidi
(74) *Attorney, Agent, or Firm*—Ladas & Parry, LLP

(57) ABSTRACT

An exchange node operable to establish a backward connection comprising part of a call session, the exchange node being operable, on the occurrence of a fault in a backward direction of the exchange to transmit a pivot request to a pivot node in a backward direction of the fault, the pivot request comprising a redirection request, a call identifier, and instructions to establish a return connection between the pivot node and a nominated node.

15 Claims, 6 Drawing Sheets

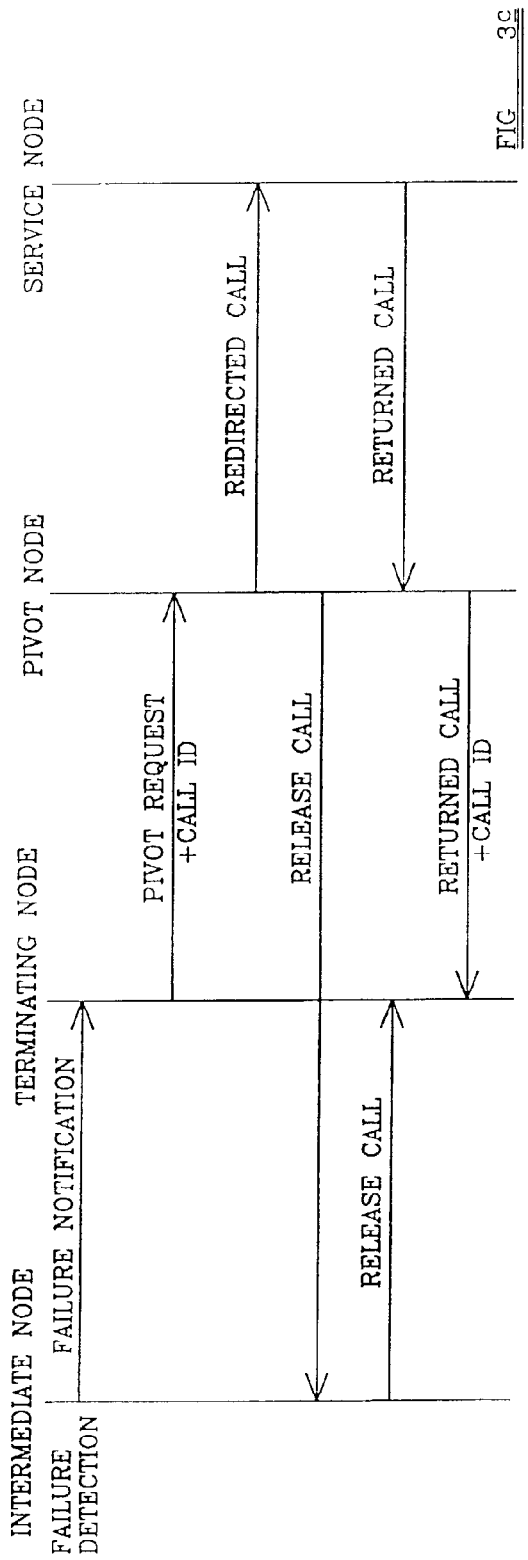
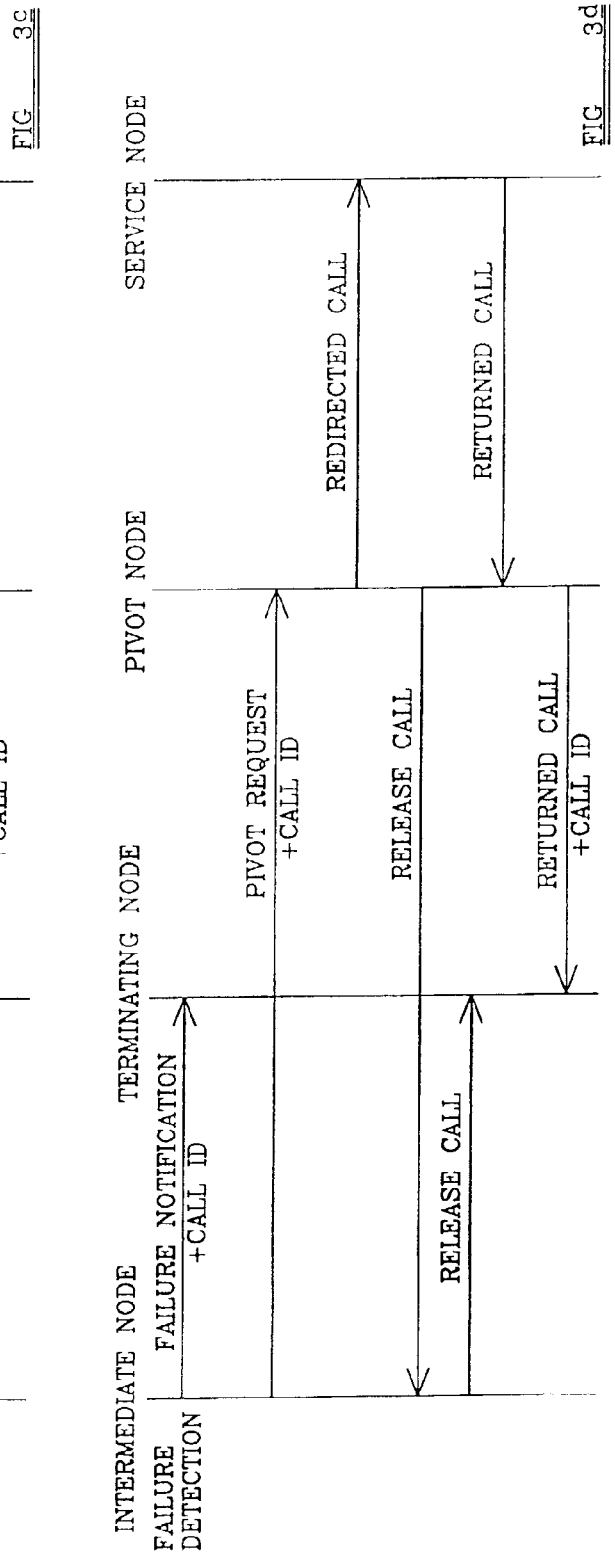

EXCHANGE NODE

DESCRIPTION OF INVENTION

This invention relates to an exchange node, an intermediate node, a network and a method of re-establishing a call session particularly but not exclusively for providing re-establishment of a call session in the event of a network fault.

BACKGROUND OF THE INVENTION

A public switched telephone network (PSTN) conventionally comprises a plurality of nodes, or exchanges, which are interconnected by trunks which provide the call-carrying capacity of the network. The nodes are also interconnected by a signalling layer which handles the routing of calls and co-ordination of the nodes.

When a user device begins to make a call, an originating node to which the user device is connected transmits an initial address message (IAM) to a node in a forward direction of the call, i.e. towards a destination node. In the following specification the "forward direction" is intended to refer to a direction away from the originating node towards the destination node while "backward direction" is intended to refer to a direction away from the destination node and towards the originating node. Hence, a "forward connection" of a node is a connection between the node and a further node in the forward direction of the node, and similarly a "backward connection" of a node refers to a connection between the node and a further node in the backward direction of the node. "Call session" refers to the connection or connections between nodes necessary to connect the originating node and destination node.

The IAM includes codes identifying the originating node, the destination node, a circuit identification code for the trunk to be used and the dialled digits. The forward node reserves the voice circuit identified by the circuit identification code for the trunk between the originating node and forward node and sends an acknowledgement, an address complete message (ACM), in the backward direction to the originating node. A voice circuit on the trunk connecting the two nodes has therefore been reserved for the call session. Successive nodes are then connected in the same way until a connection is established between the originating node and the destination node.

When a call session ends, a node will release the relevant trunk circuit and send a release instruction (REL) to the other node connected to the trunk. The other node will likewise release the trunk circuit and send a release complete (RLC) message. The trunk circuits used in a call session will be successively released in the same way.

Using this mechanism, it is possible to establish a call which is routed such that it doubles back on itself, i.e. it is routed from a first node to a second node and then back to the first node, a phenomenon known as "tromboning" Tromboning is likely to arise in situations such as call forwarding where a call is routed to a destination exchange and then returned from the destination exchange, tying up network resources unnecessarily. Tromboning is also associated with number portability, and can also occur in other situations such as establishing conference calls, or establishing calls to roaming numbers in a mobile telecommunications network for example as discussed in U.S. Pat. No. 5,884,179. To overcome the problem of tromboning, one solution is so called "pivot routing", described in for example ITU-T Recommendation Q730, which provides a general mechanism that can be invoked by an exchange or node in a network that decides that a call session should be sent to a called number other than that identified in the initial address message and where it is desirable to release the invoking exchange from the call path. When transmitting an IAM, an exchange can forward the information that it has the capacity to perform pivot routing. An exchange in the forward direction of the call can send a pivot request invoking this pivot capacity. The pivot request includes a redirection number to which the call should be redirected and optionally, instructions that the pivot call should be returned to the invoking exchange and a returned call identifier. When this happens, the pivot exchange can forward the call to the redirection number, or alternatively request a preceding exchange which also has a pivot routing capability to route the call session to the alternative called number.

ITU-T Q730 also specifies a further capability, call redirection, which provides the same functionality as pivot routing in that a call may be released to a different number at a node's request, and returned to that node. The capability is suggested for use when the node requesting redirection retains some interest in the call. For convenience, throughout this specification and claims the term 'pivot' will be used to refer to both pivot routing and call redirection, and the specification and claims should be read accordingly Each trunk in a network carries a large number of voice circuits, so that each trunk can provide a leg of a large number of call sessions. It will be apparent that in the event of the failure of a network element, for example a trunk or a node, a large number of call sessions will fail and will need to be re-routed. To provide backup for such an event, the PSTN conventionally has a plurality of duplicate elements allowing a call session to be switched from a failing element to a backup element. For example, each pair of nodes is generally connected by two trunks, a main trunk and a backup trunk. In the event of failure of the main trunk, the node at each end of the trunk detects the failure and transfers all call sessions to the backup trunk. This approach however requires duplication of costly hardware, the provision of appropriate control technology, and the provision of an idle trunk connection.

An aim of the present invention is to reduce or overcome the above problem.

SUMMARY OF THE PRESENT INVENTION

According to a first aspect of the invention we provide an exchange node operable to re-establish a call session, the exchange node being operable to establish a backward connection comprising part of a call session, and on the occurrence of a fault to transmit a pivot request to a pivot node in a backward direction of the fault, the pivot request comprising a redirection request, a call identifier, and instructions to establish a return connection between the pivot node and a nominated node.

The exchange node may comprise the nominated node, and the exchange node may be operable on establishment of the return connection to receive the call identifier, read the call identifier and re-establish the call session.

Where the call session has a forward connection the exchange node may be operable to maintain the forward connection on occurrence of the fault and to connect the return connection to the forward connection.

The exchange node may be operable to release the backward connection on receipt of a release instruction from the pivot node.

The exchange node may be operable to transmit a fault notification to the nominated node, the fault notification comprising the call identifier.

Where the call session has a forward connection the exchange node may be operable to release the backward connection on receipt of a release instruction from the pivot node and to release the forward connection.

The exchange node may be operable to transmit the pivot request in a occurrence of a fault in a backward direction of a node.

The exchange node may comprise a plurality of elements and the exchange node may be operable to transmit a pivot request in the event of failure of one of said elements such that the return connection is established to another of the elements.

The exchange node may be operable to detect the occurrence of a fault in the backward connection.

The exchange node may be operable to receive a fault notification from an intermediate node.

According to a second aspect of the invention we provide an exchange node operable to establish a backward connection comprising part of a call session, the exchange node being operable to receive a fault notification comprising a call identifier, receive a return connection identified by the call identifier and re-establish the call session.

According to a third aspect of the invention we provide an exchange node, operable to establish a forward connection and a backward connection, the forward connection and backward connection comprising part of a call session, the exchange node being operable to detect the occurrence of a fault in the backward connection, and transmit a fault notification to a forward node.

According to a fourth aspect of the invention we provide a network provided with at least one of an exchange node according to the first aspect of the invention, an exchange node according to the second aspect of the invention and an exchange node according to the third aspect of the invention.

According to a fifth aspect of the invention we provide a method of re-establishing a call session comprising a backward connection, the method comprising the steps of, on occurrence of a fault, transmitting a pivot request to a pivot node in the backward direction of the fault, the pivot request comprising; a redirection request, a call identifier, and instructions to establish a return connection.

The method may comprise the steps of receiving the return connection, receiving the call identifier and re-establishing the call session.

Where the call session comprises a forward connection, the step of re-establishing the call session may comprise the step of connecting the return connection and the forward connection.

The method may comprise the step of releasing the backward connection.

According to a sixth aspect of the invention we provide a method of re-establishing a call session comprising a forward connection and a backward connection comprising the steps of detecting a fault in the backward connection, and transmitting a fault notification to a forward node. The present invention thus makes use of the pivot re-routing capability to enable a disrupted call sessions to be re-established by re-routing the call around a failed network element.

BRIEF DESCRIPTION OF THE DRAWINGS

The invention will now be described by way of example only with reference to the accompanying drawings, wherein;

Referring now to FIG. 1, a prior art network is generally indicated at 10 comprising an originating node 11, a terminating node 12, a first intermediate node 13, and a second intermediate node 14. The network is provided with a signalling layer 15, to which each node 11, 12, 13, 14 is connected by signalling links 11a, 12a, 13a, 14a respectively. The nodes 11, 12, 13, 14 are interconnected by main trunks 16 and backup trunks 17. In SS7 terminology the originating node 11, terminating node 12 and intermediate nodes 13, 14 all comprise service switching points (SSP's). The signalling links 13a, 14a, 15a, 16a comprise type "A" links connecting each SSP to a corresponding signal transfer point (STP) (not shown) which forms part of the signalling layer 15. Each node 11, 12, 13, 14 is provided with automatic protection switching means 11b, 12b, 13b, 14b respectively operable to detect a fault in the main trunk 16 and to switch to the backup trunk 17. When a call is made from an originating telephone or other device 18 to a destination telephone or other device 19, the call is routed from the originating node 11 to the terminating node 12 via one or both of the intermediate nodes 13, 14 in conventional manner, for example using the ISDN User Part (ISUP) protocol or using an Intelligent Network (IN) protocol or by other conventional means as appropriate. The network 10 may be provided with pivot routing means of known type as desired. Thus it may be envisaged that the call from the telephone 18 and originating exchange node 11 could be routed via the first intermediate node 14 connected to the second intermediate node 13, routed back to intermediate node 14 and on to the terminating node 12. In this example, pivot routing in conventional manner may be used to remove the routing to and from the intermediate node 13.

Referring now to FIG. 2a, a network 20 comprising at least one exchange node embodying the present invention is shown. The network 20 is provided with an originating node 21, a terminating node 22 comprising an exchange mode embodying the present invention, a first intermediate node 23, a second intermediate node 24 and a signalling layer 25. The nodes 21, 22, 23, 24 are connected to the signalling layer 25 by signalling links 21a, 22a, 23a, 24a respectively. The originating node is connected to the first intermediate node 23 and the second intermediate node 24 by trunks 26a, 26b respectively. The terminating node 22 is similarly connected to the first intermediate node 23 and second intermediate node 24 by trunks 26c, 26d respectively. The first intermediate node 23 and second intermediate node 24 are interconnected by a trunk 26e. The network 20 in the present example is also provided with a service node 27, in the present example connected to the intermediate node 23.

Figure 1:
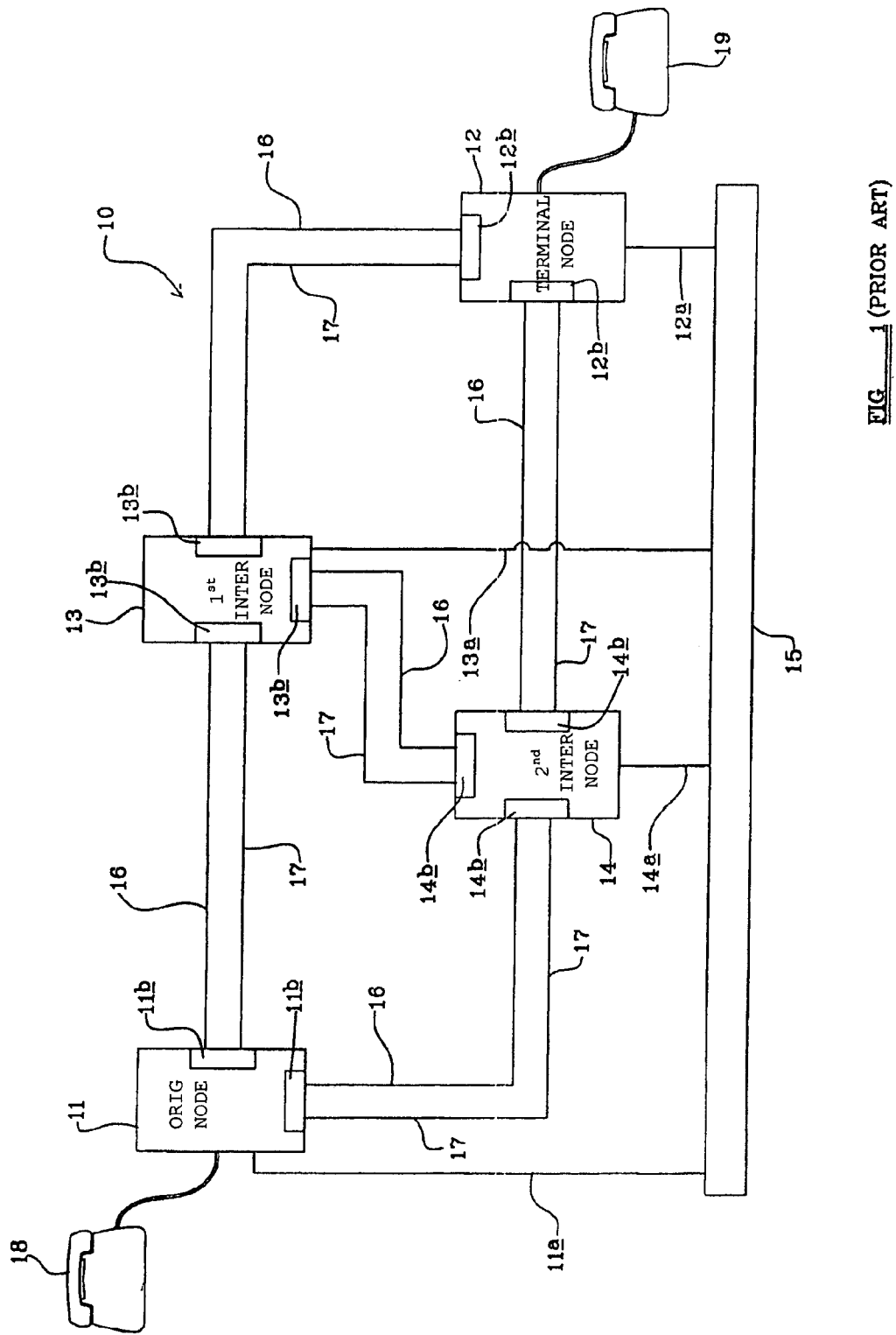
FIG. 1 is an illustration of a prior art public switched telephone network.

When a call is made from an originating telephone or other device 28 to a destination telephone or other device 29, the network 20 functions in like manner to the network shown in 10. The nodes of the network 20 are however connected by single trunks, i.e. there are no redundant trunks, and no automatic protection switching means is therefore provided at each node. An exchange node according to the first aspect of the present invention is provided as the terminating node 22, and at least the first intermediate node 23 is provided with a pivot routing capacity of standard type as described hereinbefore.

In the present example, a call session has been established in conventional manner from the telephone 28 to the telephone 29 via the originating node 21, first intermediate node 23 and terminating node 22. The terminating node 22 thus establishes a forward connection to the destination telephone 29 and a backward connection on trunk 26c to the first intermediate node 23.

In the event of a failure, the network 20 functions in the following manner, with reference to FIG. 2b. A fault 26f develops on trunk 26c, which is detected by the terminating node 22. The terminating node 22 sends a pivot request via the signalling link 22a, signalling network 25 and signalling link 23a to the first intermediate node 23. The pivot request carries a redirection request to a particular network address, in this case the address of the service node 27, a call identifier, and instructions to return the call to a nominated node, in this example, the invoking node, i.e. the terminating node 22. The first intermediate node 23 receives the pivot request, and assuming it is valid, re-directs the call to the service node 27. The first intermediate node 23 releases the connection to trunk 26c, and sends a release instruction to the terminating node 22 to do likewise. However, the terminating node 22 maintains the forward connection to the telephone 29, and associates the forward connection with the call identifier.

The service node 27, on receiving the re-directed call, in this example, plays a short announcement, and returns the call to the first intermediate node 23. Alternatively, the redirected call may be treated by the service node 27 as a null call, returning the call to the first intermediate node 23 without performing any other action. The first intermediate node 23 then will attempt to re-connect the call to the terminating node 22 by establishing a return connection in accordance with the return to the invoking node instruction. The return connection is established in conventional manner via the trunk 26e, second intermediate node 24, trunk 26d and terminating node 22. The initial address messages transmitted via the signalling network 25 to establish the connections over trunks 26e and 26d will carry the call identifier transmitted with the pivot request. The terminating node 22 then matches the call identifier received in the initial address message with the call identifier corresponding to the forward connection to the destination telephone 29 and provides a connection, re-establishing the call session.

In this embodiment, the network thus takes advantage of a standard procedure to provide a novel and unexpected technique for accommodating equipment failure. The provision of the call identifier enables the terminating node to reconstruct the call session so that a user perceives no or almost no disruption in the interaction. Although in the example of FIG. 2, the fault occurs in a trunk directly connected to the terminating node, it is envisaged that the node would be responsive to a fault occurring anywhere in the call route and operable to send a pivot request to an appropriate node located backward of the fault as discussed.

In another embodiment, as shown in FIGS. 3a, 3b, 3c and 3d, the failure monitoring is performed at an intermediate node. Referring to FIG. 3, a network is generally indicated at 30, again provided with an originating node 31, a terminating node 32 comprising an exchange node embodying the present invention, a first intermediate node 33 provided with pivot routing capacity, a second intermediate node 34 embodying the present invention, a third intermediate node 35 and a signalling network 36. The nodes 31, 32, 33, 34, 35 are connected to the signalling network 36 by signalling links 31a, 32a, 33a, 34a, 35a respectively. The nodes are interconnected by trunks 36a-36h in like manner to the network of FIG. 2. The network is further provided with a service node 38.

In this example, a call from an originating telephone or other device 39 is connected in conventional manner to a destination telephone or other device 40 via the originating node 31, trunk 36a, first intermediate node 33, trunk 36e, second intermediate node 34, trunk 36d and terminating node 32. A fault 37 occurs in trunk 36e between the intermediate nodes 33, 34. The second intermediate node 34 detects the failure and initiates the re-routing of the call session.

Three alternative modes of operation in response to detection of the fault by the second intermediate node 34 will now be discussed with reference to FIGS. 3b to 3d.

Figure 2A:
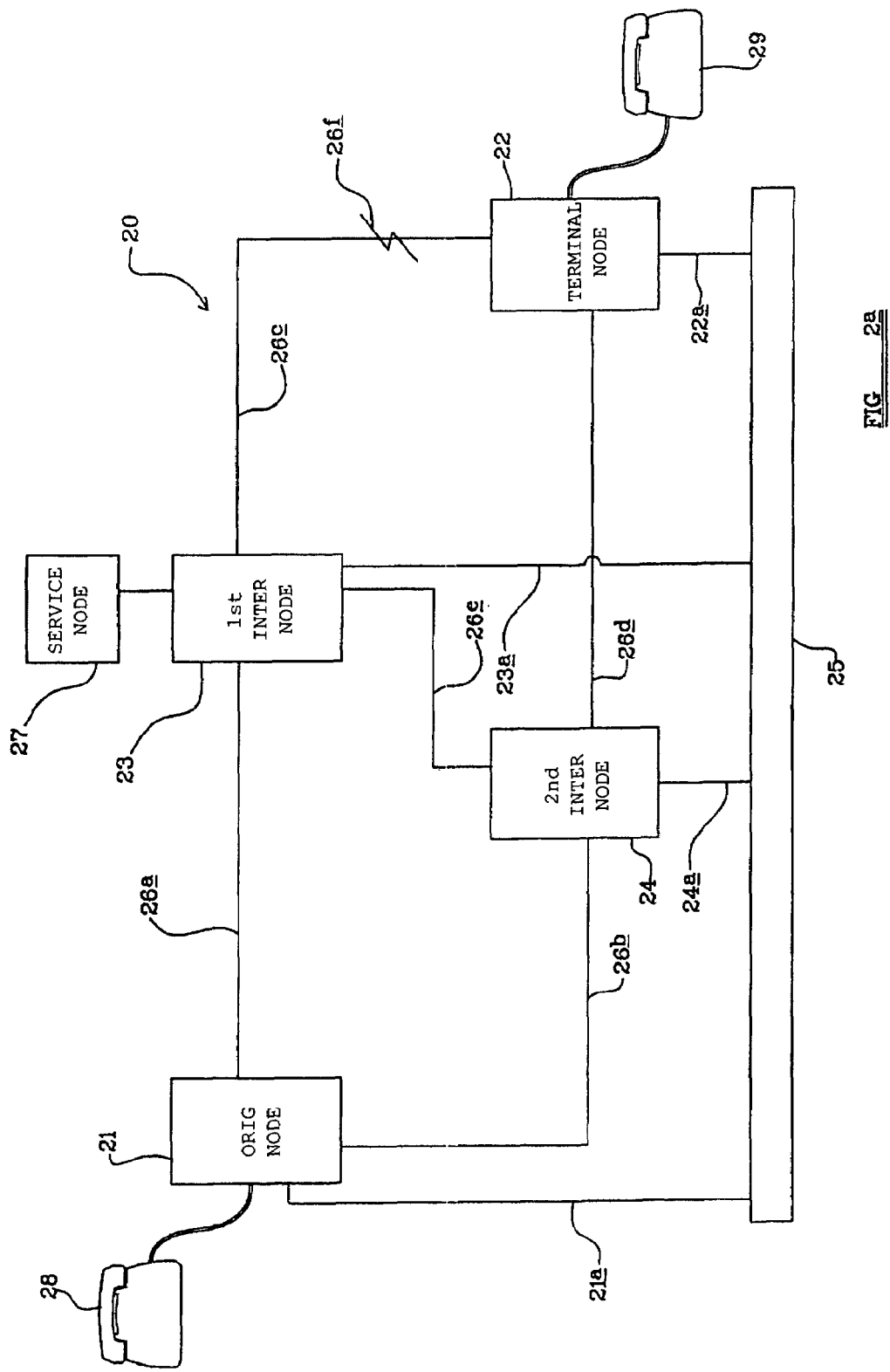
FIG. 2a is an example of a public switched telephone network provided with a terminating node embodying the present invention.
Figure 2B:
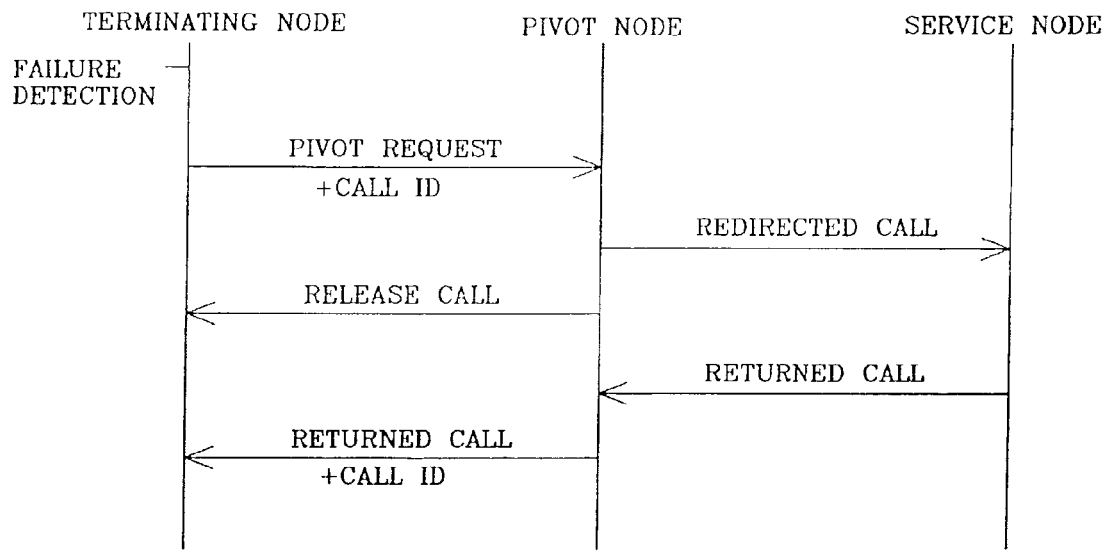
FIG. 2b is a diagrammatic illustration of the operation of the network of FIG. 2a, FIG. 3a is a further example of a public switched telephone network comprising an intermediate node embodying the second aspect of the present invention.
Figure 3B:
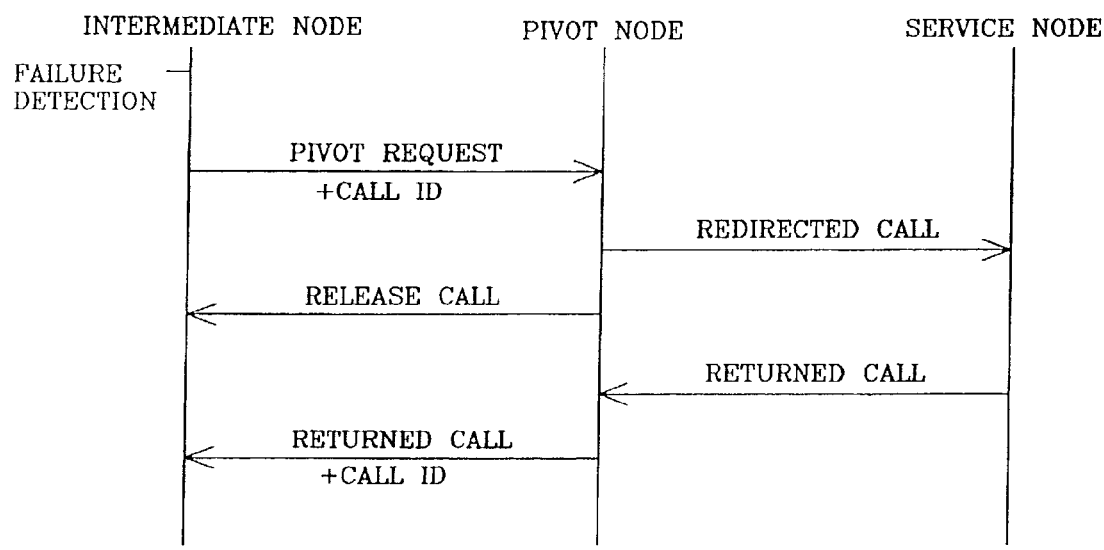
FIG. 3b is a diagrammatic illustration of a mode of operation of the network of FIG. 3a, FIG. 3c is a diagrammatic illustration of a further mode of operation of the network of FIG. 3b.
Figure 3A:
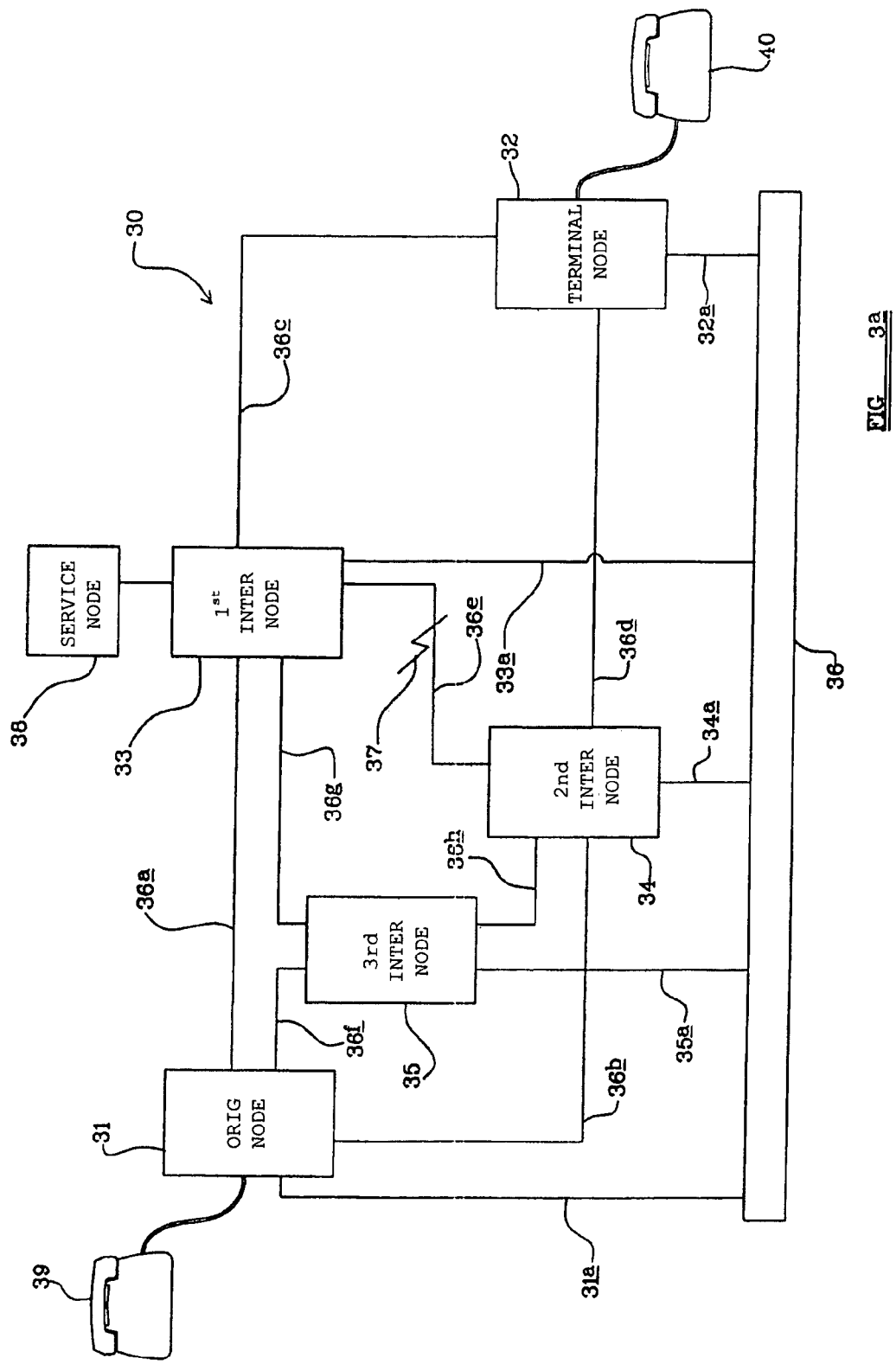
FIG. 3d is a diagrammatic illustration of a yet further mode of operation of the network of FIG. 3a, and FIG. 4 is an illustration of part of a further network embodying the present invention.

In a first mode of operation as shown in FIG. 3b, the second intermediate node 34 operates in a similar manner to the terminating node 22 of the embodiment of FIG. 2a. The second intermediate node 34 transmits a pivot request via the signalling network 36 to the exchange node upstream of the fault 37, in this case the first intermediate node 33. As in the embodiment of FIG. 2a, the pivot node 33 redirects the call to a service node 38 in like manner to the service node 27 of the embodiment of FIG. 2a.

As before, the service node 38 may play a short announcement on receiving the redirected call, and then returns the call to the first intermediate node 33. Alternatively, the redirected call may be treated by the service node 38 as a null call, returning the call to the first intermediate node 33 without performing any other action.

In accordance with the return to revoking node instruction included in the pivot request, the first intermediate node 33 will attempt to re-establish the leg of the call between itself and the second intermediate node 34 establishing a return connection. In this case, the call is routed via a trunk 36g, third intermediate node 35 and trunk 36h. The second intermediate node 34 will have released the leg of the call between it and the first intermediate node 33, but maintains the forward connection on trunk 36d to the terminating node 32. On receiving the initial address message from the third intermediate node 35, the second intermediate node 34 will be able to reconcile the call identifier included in the initial address message received from the third intermediate node 35 with the call identifier transmitted in the initial pivot request and so will establish that the return connection is to be connected to the call leg on trunk 36d, thus re-establishing the call session.

This mode of operation thus requires no action on the part of the terminating node 32 to re-establish the failed leg of the call session. The pivot request generated by the second intermediate node 34 and the response of the first intermediate node 33 are in this example in accordance with ITU-T Q730. However, as will be apparent from FIG. 3a, it is potentially wasteful of network resources. In this particular example, a further exchange node, the third intermediate node 35 and the two voice trunks 36g, 36h are required to replace the single voice trunk 36b.

In a second mode of operation as illustrated in FIG. 3c, the second intermediate node 34, on detecting the failure 37, does not itself issue the pivot request. In the second mode of operation, instead the second intermediate node 34 transmits a failure notification in the forward direction to the terminating node 32. The terminating node 32 then transmits a pivot request via the signalling layer 36, in this example to the first intermediate node 33. The intervening legs of the call, on failed trunk 36e and trunk 36d are released on transmission of a REL instruction by the intermediate node 33 in conventional manner. The terminating node 32 maintains the forward connection to the dialled telephone 40, while the first intermediate node 33 maintains the backward connection on trunk 36a to the originating node 31. The first intermediate node 33 then acts on the pivot request as discussed with reference to the embodiment of FIG. 2a, returning the call with the call identifier included in the pivot request to the terminating node 32 to establish a return connection. In this mode of operation, the notification of failure transmitted by the second intermediate node 34 is a non-standard notification, but the pivot request transmitted by the terminating node 32 is in accordance with ITU-T Q.730.

In a third mode of operation, discussed with reference to FIG. 3d, on detection of the failure 37, the second intermediate node 34 transmits a failure notification to the terminating node including a call identifier and also releases the leg of the call on trunk 36d to the terminating node 32. The second intermediate node 34 then transmits a pivot request including the call identifier to a pivot node, in this case the first intermediate node 33, with a request that the returned call be directed to a nominated node, in this case the terminating node 32. The first intermediate node 33 redirects the call to the service node 38 as before, and sends instructions to the second intermediate node 34 to release the leg of the call on the failed trunk 36e which then instructs the terminating node to release the connection on trunk 38d. The call is then returned from the service node 38, and in accordance with the request is sent to the terminating node 32. The terminating node 32 will thus receive an initial address message including the call identifier transmitted in the pivot request and also included in the failure notification from the second intermediate node 34. The terminating node 32 will thus be able to reconcile the call identifier of the return connection established between the first intermediate node 33 and the terminating node 32 with the identifier of the forward connection to the destination telephone 40. The terminating node 32 will thus be able to reestablish the call session. This mode of operation requires a non-standard pivot request in that it is necessary for the pivot node to be able to return a call to an exchange node other than the invoking exchange node, but may serve to provide a more efficient use of network resources.

In each mode of operation, it will be apparent that the pivot request, call release instructions, failure notification and any other messages may be passed through any number of intermediate exchanges as necessary. In the ITU-T Q.730 recommendation, it is for example provided for a node receiving a pivot request, where the node either can not handle pivot requests or is able to decline to perform the pivot request, to pass the pivot request in a backward direction until it is received by a pivot-enabled node which is operable to perform the pivot request. It might for example be envisaged that the pivot request be passed ultimately to the originating node 31 such that all intervening legs of the call session are dropped and such that a new route is established between the originating node 31 and terminating node 32 to provide the most flexible and thus potentially most efficient view of network resources.

Figure 4:
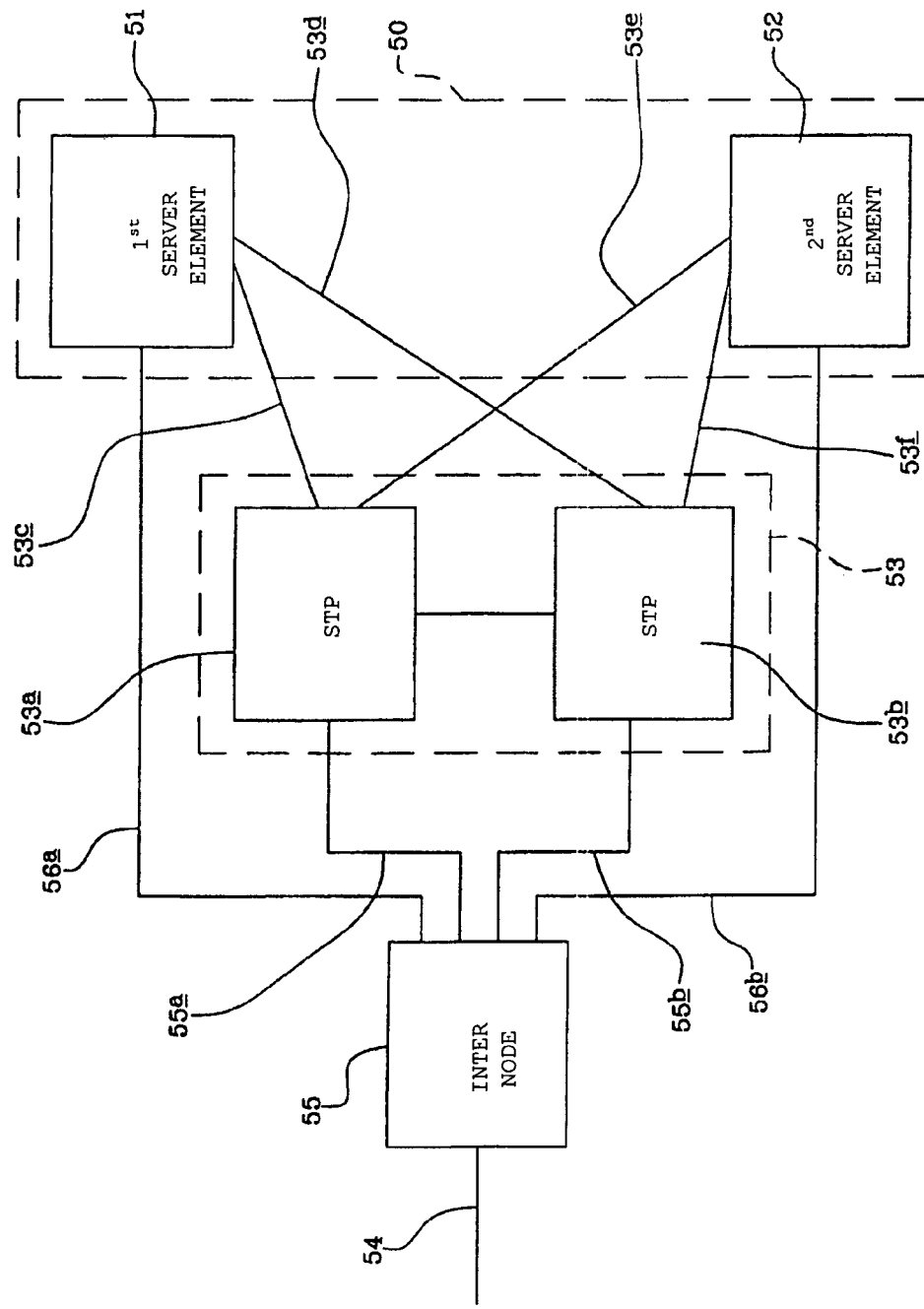

FIG. 4 shows a yet further embodiment of the present invention operable to deal with an equipment fault. A terminating node comprising a service node is generally indicated at 50, comprising a main server element 51 and a back up server element 52. The service node 50 is connected to the signalling layer as generally indicated at 53, in this example comprising a pair of signal transfer points (STP's) 53a, 53b, by signalling links 53c, 53d, 53e, 53f. The service element 50 is addressable from a PSTN, in this example by a trunk 54, intermediate node 55 and trunks 56a, 56b. The first server element 51 and the second server element 52 are provided with the same call address, as is schematically indicated by the connection of both server elements 51, 52 to the trunk 56. The intermediate mode 55 is further connected to the signalling layer 53 by signalling links 55a, 55b. The STPs 53a, 53b form a redundant linked pair of STPs.

The backup server element 52 is arranged to mirror the main server element 51 such that when a call session is connected to the server element 51, in the event of a failure of the server element 51, the backup server element 52 is able to take over without loss of function. To do so, the backup server element 52 needs to receive a call identifier from the first server element 51.

On failure of the first server element 51 the service node 50 sends a pivot request to the intermediate node 55 via the signalling layer 53. In like manner to the pivot request discussed hereinbefore, the pivot request comprises a redirected call address, a call identifier, and a request to return the call to the invoking node. In this case the redirected call address is the address of the service node 50. The intermediate node 55, on receiving the request, attempts to redirect call to the service node 50, but in accordance with the standard pivot mechanism, will not forward the call identifier. As the first server element 51 has failed, the backup server element 52 will take over and receive the redirected call, but since the redirected call will not carry any call identifier, will release the call back to the intermediate node 55. In accordance with the pivot request, the intermediate node 55 then attempts to return the call to the requesting node, i.e. to the service node 50, and will do so with the call identifier. The backup server element 52 will receive the return connection, with the call identifier, and be able to re-establish the call session.

It will be apparent that the need for the intervening null call to the service node 50 would be removed if the call identifier is passed on with the redirected call.

With reference to the network of FIGS. 2 and 3 it will be apparent that the method of reestablishing a call can also accommodate failures at nodes. In this case, a pivot request will be sent from a node forward of the failed node to a pivot node backwards of the failed node to permit call re-routing to occur.

In ITU-T Q730, when a node establishes a forward connection to another node, the establishing node can also transmit the information that it is provided with a pivoting capability. If a pivot request is received by a node which is not provided with a pivoting capability, the node can transmit the request in a backwards direction until it is received by a node with pivoting capability. Further, nodes with a pivoting capability may be configured to only accept a pivot request where the pivot request contains a reason for the request and where the reason is acceptable to the pivot node. Thus, in the example of FIG. 3a, the first intermediate node 33 may be operable to perform a pivot request for, for example, anti-tromboning purposes, but not for call re-routing in the event of equipment failure, in which case the pivot request is passed in a backward direction by the first intermediate node 33 to the originating node 31.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An exchange node operable to re-establish a call session, the exchange node being operable to establish a backward connection comprising part of a call session, and on the occurrence of a fault to
    transmit a pivot request to a pivot node in a backward direction of the fault, the pivot request comprising:
        a redirection request,
        a call identifier, and
        instructions to establish a return connection between the pivot node and a nominated node.

2. An exchange node according to claim 1 wherein the exchange node comprises the nominated node, the exchange node being operable on establishment of the return connection to receive the call identifier, read the call identifier and re-establish the call session.

3. An exchange node according to claim 2 wherein the call session has a forward connection and the exchange node is operable to maintain the forward connection on occurrence of the fault and to connect the return connection to the forward connection.

4. An exchange node according to claim 1 operable to release the backward connection on receipt of a release instruction from the pivot node.

5. An exchange node according to claim 1 operable to transmit a fault notification to the nominated node, the fault notification comprising the call identifier.

6. An exchange node according to claim 5 wherein the call session has a forward connection and the exchange node is operable to release the backward connection on receipt of a release instruction from the pivot node and to release the forward connection.

7. An exchange node according to claim 1 being operable to transmit the pivot request on occurrence of a fault in a backward direction of a node.

8. An exchange node according to claim 1 comprising a plurality of elements, the exchange node being operable to transmit a pivot request in the event of failure of one of said elements such that the return connection is established to another of the elements.

9. An exchange node according to claim 1 operable to detect the occurrence of a fault in the backward connection.

10. An exchange node according to claim 1 operable to receive a fault notification from an intermediate node.

11. A network provided with an exchange node according to claim 1.

12. A method of re-establishing a call session comprising a backward connection, the method comprising the steps of, on occurrence of a fault
    transmitting a pivot request to a pivot node in the backward direction of the fault,
    the pivot request comprising:
    a redirection request,
    a call identifier, and
    instructions to establish a return connection between the pivot node and a nominated node.

13. A method according to claim 12 comprising the steps of receiving the return connection, receiving the call identifier and re-establishing the call session.

14. A method according to claim 13 wherein the call session comprises a forward connection and the step of re-establishing the call session comprises the step of connecting the return connection and the forward connection.

15. A method according to claim 12 comprising the step of releasing the backward connection.

* * * * *